(12) United States Patent
Guarnieri et al.

(10) Patent No.: US 10,055,590 B2
(45) Date of Patent: *Aug. 21, 2018

(54) RULE MATCHING IN THE PRESENCE OF LANGUAGES WITH NO TYPES OR AS AN ADJUNCT TO CURRENT ANALYSES FOR SECURITY VULNERABILITY ANALYSIS

(71) Applicant: International Business Machines Corporation, Armonk, NY (US)

(72) Inventors: Salvatore Angelo Guarnieri, New York, NY (US); Marco Pistoia, Amawalk, NY (US); Stephen Darwin Teilhet, Milford, NH (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 14/026,065

(22) Filed: Sep. 13, 2013

(65) Prior Publication Data

US 2014/0237604 A1 Aug. 21, 2014

Related U.S. Application Data

(63) Continuation of application No. 13/771,917, filed on Feb. 20, 2013, now Pat. No. 9,384,354.

(51) Int. Cl.
*G06F 21/57* (2013.01)
*G06F 11/36* (2006.01)

(52) U.S. Cl.
CPC ........ *G06F 21/577* (2013.01); *G06F 11/3612* (2013.01); *G06F 2221/033* (2013.01)

(58) Field of Classification Search
CPC ..................................................... G06F 21/577
(Continued)

(56) References Cited

U.S. PATENT DOCUMENTS 5,764,906 A * 6/1998 Edelstein et al. ............. 709/219
5,774,719 A * 6/1998 Bowen .......................... 719/330
(Continued)

OTHER PUBLICATIONS

Livshits, "Merlin: Specification Inference for Explicit Information Flow Problems", PLDI'09, Jun. 15-20, 2009, p. 1-12.*
(Continued)

*Primary Examiner* — Taghi Arani
*Assistant Examiner* — Gregory Lane
(74) *Attorney, Agent, or Firm* — Harrington & Smith

(57) ABSTRACT

A method includes reading by a computing system a rule file including one or more rules having specified paths to methods, each method corresponding to one of a sink, source, or sanitizer. The method includes matching by the computing system the methods to corresponding ones of sinks, sources, or sanitizers determined through a static analysis of an application. The static analysis determines at least flows from sources of information to sinks that use the information. The method includes performing by the computing system, using the sinks, sources, and sanitizers found by the matching, a taint analysis to determine at least tainted flows from sources to sinks, wherein the tainted flows are flows passing information to sinks without the information being endorsed by a sanitizer. Apparatus and program products are also disclosed.

16 Claims, 5 Drawing Sheets

(58) Field of Classification Search
USPC .......................................... 726/25; 717/126
See application file for complete search history.

(56) References Cited

U.S. PATENT DOCUMENTS

| | | |
|---|---|---|
| 7,324,514 B1 | 1/2008 | Haq et al. |
| 7,877,782 B2 | 1/2011 | Yamamoto et al. |
| 7,958,558 B1 | 6/2011 | Leake |
| 2001/0020266 A1* | 9/2001 | Kojima et al. .......... 712/225 |
| 2002/0147706 A1 | 10/2002 | Burnett |
| 2002/0152226 A1 | 10/2002 | Burnett |
| 2003/0074440 A1* | 4/2003 | Grabarnik et al. .......... 709/224 |
| 2004/0128556 A1 | 7/2004 | Burnett |
| 2004/0216150 A1 | 10/2004 | Scheifler et al. |
| 2005/0086197 A1 | 4/2005 | Boubez et al. |
| 2006/0137010 A1 | 6/2006 | Kramer et al. |
| 2006/0247806 A1 | 11/2006 | Inoue et al. |
| 2008/0168560 A1 | 7/2008 | Durie et al. |
| 2008/0209567 A1 | 8/2008 | Lockhart et al. |
| 2009/0119325 A1* | 5/2009 | Petri .......... 707/102 |
| 2009/0125977 A1 | 5/2009 | Chander et al. |
| 2009/0158430 A1 | 6/2009 | Borders |
| 2010/0058475 A1 | 3/2010 | Thummalapenta |
| 2010/0083240 A1 | 4/2010 | Siman |
| 2010/0095094 A1 | 4/2010 | Vorbach et al. |
| 2011/0072517 A1 | 3/2011 | Tripp |
| 2011/0173693 A1 | 7/2011 | Wysopal et al. |
| 2011/0179400 A1 | 7/2011 | Scholz et al. |
| 2011/0191855 A1* | 8/2011 | De Keukelaere et al. ..... 726/25 |
| 2011/0197180 A1 | 8/2011 | Huang |
| 2011/0246223 A1 | 10/2011 | Rundensteiner |
| 2011/0252475 A1 | 10/2011 | Mui et al. |
| 2011/0302566 A1 | 12/2011 | Abadi et al. |
| 2012/0011493 A1 | 1/2012 | Singh |
| 2012/0023486 A1* | 1/2012 | Haviv et al. .......... 717/126 |
| 2012/0131668 A1 | 5/2012 | Berg |
| 2012/0144491 A1 | 6/2012 | Pistoia |
| 2012/0167209 A1* | 6/2012 | Molnar et al. .......... 726/22 |
| 2012/0174229 A1 | 7/2012 | Pistoia |
| 2012/0210432 A1 | 8/2012 | Pistoia |
| 2012/0216177 A1 | 8/2012 | Fink et al. |
| 2012/0222123 A1 | 8/2012 | Williams et al. |
| 2012/0266247 A1 | 10/2012 | Guy |
| 2012/0304161 A1 | 11/2012 | Ahadi |
| 2013/0294236 A1 | 11/2013 | Beheshti-Zavareh et al. |
| 2014/0047538 A1 | 2/2014 | Scott et al. |
| 2014/0090065 A1 | 3/2014 | Guarnieri |
| 2014/0237604 A1 | 8/2014 | Guarnieri |

OTHER PUBLICATIONS

Bisht, "Automated detection of parameter tampering oppotunities and vulnerabilities in web applications", 2014, Journal of Computer Security, pp. 415-465.*

Tripp et al., "TAJ: Effective Taint Analysis of Web Applications", PLDI'09, Jun. 15-20, 2009, Dublin, Ireland, (11 pages).

Anonymous, "System, Method, and Apparatus for Precise Static Data-flow Analysis of Weakly-typed Languages", IPCOM000205165D, Mar. 17, 2011, 3 pages.

Anonymous; "System, Method and Apparatus for Static Discovery of Insecure Direct Object Reference Vulnerabilities"; IPCOM000219812D; Jul. 17, 2012; whole document (4 pages).

IBM; "Security-oriented Execution Flow Validation using Static Analysis Techniques"; IPCOM000188096D; Sep. 22, 2009; whole document (3 pages).

Petukhov; "Detecting Security Vulnerabilities in Web Applications Using Dynamic Analysis with Penetration Testing"; Application Security Conference; May 2008; Ghent, Belgium; whole document (16 pages).

Wassermann; "Sound and Precise Analysis of Web Applications for Injection Vulnerabilities"; PLDI'07; Jun. 11-13, 2007; San Diego, California, USA; pp. 32-41.

Balzarotti; "Multi-Module Vulnerability Analysis of Web-based Applications"; CCS'07; Oct. 29-Nov. 2, 2007; Alexandria, Virginia; whole document (11 pages).

Guarnieri; "Gatekeeper: Mostly Static Enforcement of Security and Reliability Policies for JavaScript Code"; USENIX Security Symposium; 2009; whole document (18 pages).

Livshits; "Improving Software Security with Precise Static and Runtime Analysis"; Stanford University, dissertation; Dec. 2006; whole document (250 pages).

Xu; "Practical Dynamic Taint Analysis for Countering Input Validation Attacks on Web Applications"; Stony Brook University; 2006; pp. 1-15.

* cited by examiner

```xml
<special_rules>
    <object type="source">
        <!-- This is an example -->
        <!-- It describes a method path that returns objects of interest -->
        <!-- It describes objects that come about like the following: -->
        <!-- object = specialObject.fun1(args).fun2(args).
              fun3(args).field1.fun4(args) -->
        <!-- or something like -->
        <!-- var x = specialObject.fun1(args); var y = fun2(x, args); for (i = 1 to
              10) { z = fun4(y.fun3(i).field1); ... sink(z)} -->
        <!-- specialObject is a special object like document or window where we
              care about the instance, not the constructor -->
        <name>Example</name>
        <method_of_interest>
            <plural>false</plural>
            <method_part final="false">specialObject.fun1</method_part>
            <method_part final="false">fun2</method_part>
            <method_part final="false">fun3</method_part>
            <field_part final="false">field1</field_part>
            <method_part final="true">fun4</method_part>
        </method_of_interest>
        <source_field>
            <field_name>a</field_name>
            <rule_ids>r:1, r:2, r:5</rule_ids>
        </source_field>
    </object>
    <object type="source">
        <name>Attribute</name>
        <method_of_interest>
            <plural>false</plural>
            <method_part final="false">Node</method_part>
            <method_part final="true">getMetadata</method_part>
        </method_of_interest>
        <source_field>
            <field_name>*</field_name>
            <rule_ids>r:7</rule_ids>
        </source_field>
    </object>
    •
    •
    •
```

FIG. 2A

RULE MATCHING IN THE PRESENCE OF LANGUAGES WITH NO TYPES OR AS AN ADJUNCT TO CURRENT ANALYSES FOR SECURITY VULNERABILITY ANALYSIS

CROSS-REFERENCE TO RELATED APPLICATIONS

This patent application is a continuation of U.S. patent application Ser. No. 13/771,917, filed on Feb. 20, 2013, which is incorporated herein by reference in its entirety to provide continuity of disclosure.

BACKGROUND

This invention relates generally to analysis of application code and, more specifically, relates to analysis of programs using rule matching for languages with no types or as an adjunct to current analyses, for security vulnerability analyses.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms that appear in the text or drawings are defined below, prior to the claims.

Information-flow violations comprise the most serious security vulnerabilities in today's Web applications. Such information-flow violations may include the following: cross-site scripting (XSS) attacks, which occur when a Web application accepts data originating from a user and sends the data to another user's browser without first validating or encoding the data; injection flaws, the most common of which is Structured Query Language injection (SQLi), which arise when a Web application accepts input from a user and sends the input to an interpreter as part of a command or query, without first validating the input; malicious file executions, which happen when a Web application improperly trusts input files or uses unverified user data in stream functions, thereby allowing hostile content to be executed on a server; and information leakage and improper error-handling attacks, which take place when a Web application leaks information about its own configuration, mechanisms, and internal problems. Each of these vulnerabilities can be cast as a problem in which tainted information from an untrusted "source" propagates, through data and/or control flow, to a high-integrity "sink" without being properly endorsed (i.e., corrected or validated) by a "sanitizer".

Automatically detecting such vulnerabilities in real-world Web applications may be difficult. However, static analysis may be used to analyze Web applications. Static analysis is an analysis that involves examining the code of applications such as Web applications without executing the code of the Web application. Some type of model is (or models are) created of the code of the application, to estimate what would happen when the code actually is executed. One part of a static analysis for these vulnerabilities is a taint analysis, which tracks "taint" from sources to sinks (or to and through sanitizers).

Rules are something used by taint analyses to configure where to start tracking tainted flows, where to stop tracking tainted flows, and where to report vulnerabilities. Traditionally, rules are expressed using types of objects, e.g., the method getText from the type UserContent returns (potentially) malicious data; this method would be a source, which is where tainted flows start. A source is a method whose return value is considered tainted (e.g., untrusted) or an assignment from a tainted field of an object. A rule for this source might indicate that "objects of type UserContent are sources of potential taint". A taint analysis therefore examines objects based primarily on type. Tainted flows are typically invalidated at sanitizers, and terminated at sinks, although these actions may be up to the implementation of the analysis. A sanitizer is a method that manipulates its input to produce taint-free output. For instance, a sanitizer such as SqlSanitizer.sanitize can be considered to produce taint-free output for the vulnerability of SQLi. Tainted flows are reported as vulnerabilities when the flows reach sinks, such as PrintStream.println. A sink is a pair (m, P), where m is a method that performs security-sensitive computations and P contains those parameters of m that are vulnerable to attack via tainted data. For the definitions of sink, source, and sanitizers and additional information, see, e.g., Tripp et al., "TAJ: Effective Taint Analysis of Web Applications", PLDI'09, Jun. 15-20, 2009, Dublin, Ireland.

In languages without a strong type system, it is difficult to dictate which objects in the program are of interest (e.g., as being sources, sinks, and sanitizers). A type (also called "data type") of an object is, e.g., a classification identifying one of various types of data that determines the possible values for that type, the operations that can be done on values of that type, the meaning of the data, and the way values of that type can be stored. It is noted that this is only one definition of type of an object, and other definitions may also be suitable. Furthermore, even with a type system, it is difficult to differentiate between a harmlessly created object of a specific type and one constructed through malicious means. For example, TextBox.getText should be a method that returns source data when the textbox is retrieved from the application, but if the method is programmatically created and never interacts with the user, the method should not be a source of taint.

BRIEF SUMMARY

The following summary is merely intended to be exemplary. The summary is not intended to limit the scope of the claims.

An exemplary method includes reading by a computing system a rule file including one or more rules having specified paths to methods, each method corresponding to one of a sink, source, or sanitizer. The method includes matching by the computing system the methods to corresponding ones of sinks, sources, or sanitizers determined through a static analysis of an application. The static analysis determines at least flows from sources of information to sinks that use the information. The method includes performing by the computing system, using the sinks, sources, and sanitizers found by the matching, a taint analysis to determine at least tainted flows from sources to sinks, wherein the tainted flows are flows passing information to sinks without the information being endorsed by a sanitizer.

In another exemplary embodiment, a computing system includes one or more memories storing computer-readable code and one or more processors. The one or more processors are configured in response to executing the computer-readable code to cause the computing system to perform: reading by the computing system a rule file comprising one or more rules having specified paths to methods, each method corresponding to one of a sink, source, or sanitizer; matching by the computing system the methods to corresponding ones of sinks, sources, or sanitizers determined through a static analysis of an application, wherein the static analysis determines at least flows from sources of information to sinks that use the information; and performing by the computing system, using the sinks, sources, and sanitizers found by the matching, a taint analysis to determine at least tainted flows from sources to sinks, wherein the tainted flows are flows passing information to sinks without the information being endorsed by a sanitizer.

In another exemplary embodiment, a computing system is disclosed that includes: means for reading by the computing system a rule file comprising one or more rules having specified paths to methods, each method corresponding to one of a sink, source, or sanitizer; means for matching by the computing system the methods to corresponding ones of sinks, sources, or sanitizers determined through a static analysis of an application and by the computing system, wherein the static analysis determines at least flows from sources of information to sinks that use the information; and means for performing by the computing system, using the sinks, sources, and sanitizers found by the matching, a taint analysis to determine at least tainted flows from sources to sinks, wherein the tainted flows are flows passing information to sinks without the information being endorsed by a sanitizer.

A further exemplary embodiment is a computer program product including a computer readable storage medium having program code embodied therewith. The program code is executable by a computing system to cause the computing system to perform: reading by the computing system a rule file comprising one or more rules having specified paths to methods, each method corresponding to one of a sink, source, or sanitizer; matching by the computing system the methods to corresponding ones of sinks, sources, or sanitizers determined through a static analysis of an application and by the computing system, wherein the static analysis determines at least flows from sources of information to sinks that use the information; and performing by the computing system, using the sinks, sources, and sanitizers found by the matching, a taint analysis to determine at least tainted flows from sources to sinks, wherein the tainted flows are flows passing information to sinks without the information being endorsed by a sanitizer.

DETAILED DESCRIPTION

As stated above, typical rules for taint analysis are based on types of objects. Thus, typical rules may specify sources, sinks, and sanitizers using types of objects. By contrast and by way of introduction, exemplary techniques herein identify objects of interest in a language, where the identification does not rely on typing of those objects. Thus, in an exemplary embodiment, rules no longer need to list the type of object or type of method that should be a source, sink, or sanitizer. Instead, rules may now describe a path to retrieve the objects or methods that are sources, sinks, or sanitizers. For example, in JavaScript elements of the DOM (document object model) are a source of a tainted flow and a rule that declares this might indicate the following: all objects retrieved from the DOM via the method document.getElementById are important, and if these objects have their innerText field read, the result of the field read will be a source for tainted flows. As is known, JavaScript (JS) is an open source client-side scripting language commonly implemented as part of a web browser in order to create enhanced user interfaces and dynamic websites.

Figure 1:
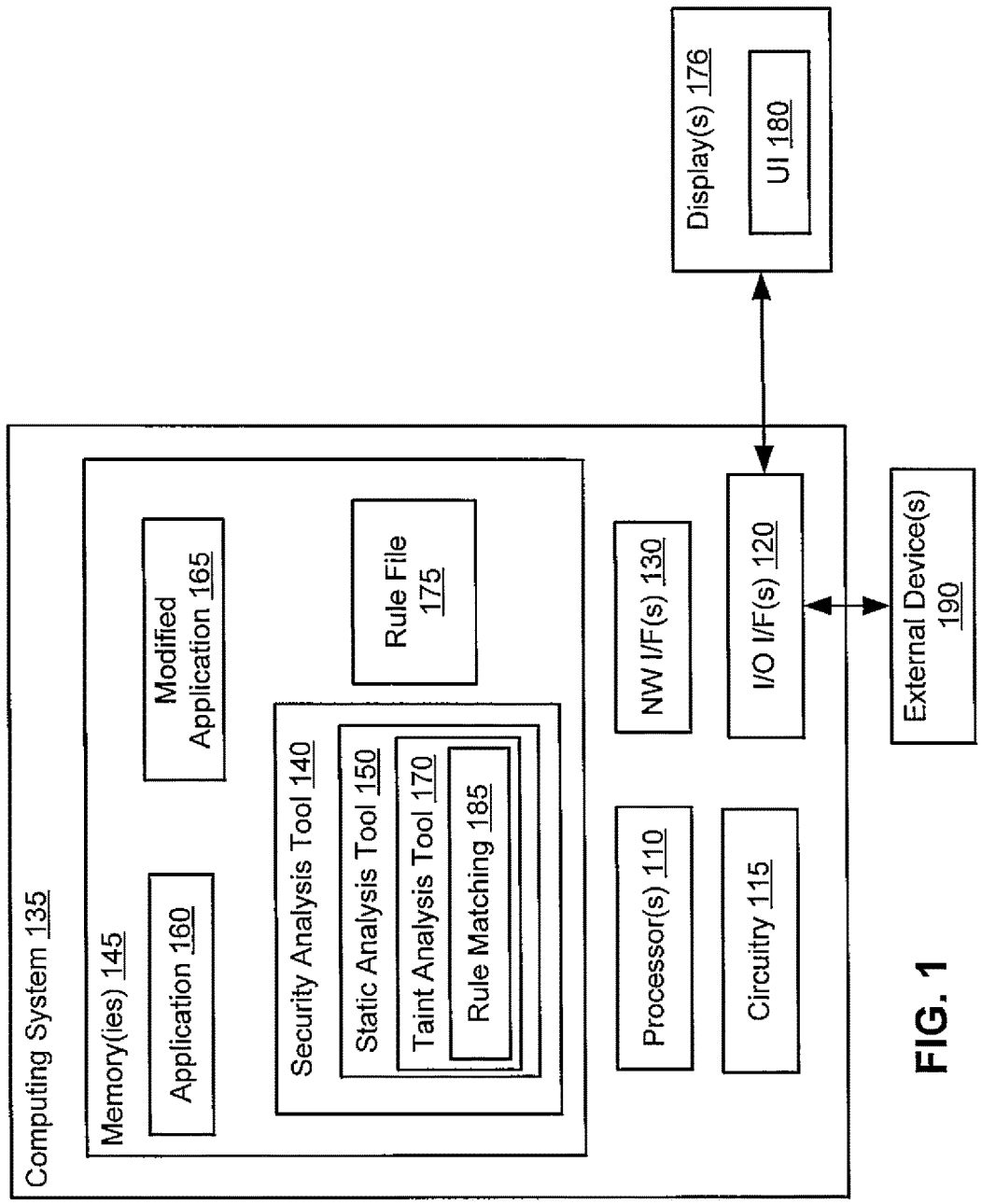
FIG. 1 is a block diagram of an exemplary computing system suitable for use for practicing exemplary embodiments of the invention.

Additional description of problems with conventional systems and how the exemplary embodiments reduce or eliminate these problems is presented after description of FIG. 1. Referring to FIG. 1, this figure is an overview of a computing system 135 suitable for use with exemplary embodiments herein. The computing system 135 comprises one or more memories 145, one or more processors 110, one or more I/O interfaces 120, and one or more wired or wireless network interfaces 130. Alternatively or in addition to the one or more processors 110, the computing system 135 may comprise circuitry 115. The computing system 135 is coupled to or includes one or more displays 176 and one or more external device(s) 190. This example provides an application 160 and modified application 165 in the one or more memories 160. The one or more memories 145 also include a security analysis tool 140 as, in an exemplary embodiment, computer-readable program code that is executable by the one or more processors 110 to cause the computing system 135 to perform one or more of the operations described herein. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing unit, such as a digital signal processor and/or single-core or multi-core general purpose processors. The circuitry 115 may be any electronic circuit such as an application specific integrated circuit or programmable logic. The memories 145 may comprise non-volatile and/or volatile RAM, cache memory, NAND-based flash memory, long term storage (e.g., hard drive), and/or read only memory. The one or more I/O interfaces 120 may include interfaces through which a user may interact with the computing system 135. The display(s) 176 may be a touchscreen, flatscreen, monitor, television, projector, as examples. A user interacts with the security analysis tool 140 through the UI 180 in an exemplary embodiment or through the network interface(s) 130 in another non-limiting embodiment. The external device(s) 190 enable a user to interact in one exemplary embodiment with the computing system 135 and may include a mouse, trackball, keyboard, and the like. The network interfaces 130 may be wired or wireless and may implement a number of protocols, such as cellular or local area network protocols. The elements in computing system 135 may be interconnected through any technology, such as buses, traces on a board, interconnects on semiconductors, and the like.

In this example, the security analysis tool 140 includes a static analysis tool 150 that further includes a taint analysis tool 170. The taint analysis tool (in this example) includes a rule matching process 185. The static analysis tool 150 performs an analysis of computer software in the application 160 that is performed without actually executing the application 160. In most cases, the analysis is performed on some version of the source code for the application 160. The taint analysis tool 170 performs taint analysis on the application 160, which involves, e.g., tracking possible taint from sources to sanitizers or sinks. The rule matching process 185, in an exemplary embodiment, reads the rule file 175 and performs operations based thereon, as described in more detail below. The security analysis tool 140 operates on the application 160 and may create a modified application 165. For instance, if based on the analysis of the taint analysis tool, a sink is reached by a flow of taint from a source to the sink without a proper endorsement by a sanitizer, the taint analysis tool 170 (e.g., or the static analysis tool 150 or the security analysis tool 140) could insert, in the flow and prior to the sink, a call to a sanitizer. The insertion may be used to create a modified application 165. As another example, the taint analysis tool 170 (e.g., or the static analysis tool 150 or the security analysis tool 140) could instead of inserting a call to a sanitizer, indicate to a user via, e.g., the UI 180 that there is a vulnerability starting at the source and ending at the sink. In this example, the application 160 may not be modified into application 165. Furthermore, modifications may be made directly to application 160, such that there is only one application (that is, there is a single application instead of application 160 and modified application 165).

JavaScript is one of many languages that does not have a strong type system. This is in contrast to a language like Java (a programming language and computing platform first released by Sun Microsystems in 1995), which has a strong type system. This is particularly important when discussing rules that are used to "bootstrap" analyses, in particular taint analyses that must define sources, sinks, and sanitizers. In Java, for instance, it is possible to specify that the return value of any invocation of getParameter on any object of type HttpServletRequest is a source. Meanwhile, the absence of specific types in JavaScript makes this sort of security configuration impossible.

To address this problem, an exemplary rule system herein specifies complete paths of retrieval for sources, sinks and sanitizers. A sample rule file that is used to configure an analysis is shown in FIG. 2. This figure shows a rule file 175 that is written using a markup language. In markup languages, a set of markup tags is used to describe document content. The tags in this example use angle brackets. The tags normally come in pairs and the pairs have start tags (also called opening tags) and end tags (also called closing tags). For instance, typically <X> is an opening tag and </X> is a closing tag, where X is a keyword. Note that this convention may not always hold; for instance, a starting tag is <object type="A">, where A is a source, sink, or sanitizer in an example, and "object type" is the keyword. Meanwhile, the closing tag is </object>, which means that the keywords are slightly different between opening and closing tags. The tags and text between the pair of tags for a keyword relates to the keyword and defines content in the document for that keyword.

In this example, there are a number of object types 210, including sources 210-1 and 210-2, a sink 210-3, and a sanitizer 210-4. For the object type 210 of source 210-1, the name 220-1 of the object is Example. There is a method 230-1 of interest. The pair 240-1 of tags (<plural> and </plural>) allow the option of either true or false. This option is a flag to state whether the method returns an array. If the flag is true, the method returns an array (as any element of the array could be a source/sink). If the flag is false, the return value of the method is a source/sink. If the flag is false, the method might still return an array, but the array itself is a source/sink not the items inside the array.

Reference 250-1 refers to a specification of a path used to retrieve a source. This is called a specified path 250 herein. The opening tag <method_part final="false"> indicates that the indicated method is not the final element in the path. The specified path 250-1 may include methods and fields. The tag <method_part final="true"> indicates that the indicated method is the final element (method in this case) in the path. The source field 260-1 has a name 265-1 of "a" and indicates that a variable returned from this field is to be marked as a source of taint.

The rule identifications (ids) r:1 270-1, r:2 270-2 and r:3 270-3 may each be considered to be a database index and each one corresponds to a particular security vulnerability, such as the vulnerabilities of cross-site scripting (XSS), SQL injection, malicious file executions, and information leakage, described above. For instance, r:1 270-1 could relate to XSS, r:2 270-2 could relate to SQL injection, and r:3 270-3 could relate to malicious file executions. Each of these security vulnerabilities is assumed to have different requirements for endorsement and therefore different sanitizers to handle the vulnerability.

Now that an introduction to part of FIG. 2 has been provided, the exemplary source object of Example and the rest of FIG. 2 will be described in reference to FIG. 3. FIG. 3 is a logic flow diagram for performing rule matching and illustrates operations performed by a rule matching process 185. This figure also illustrates the operation of an exemplary method, a result of execution of computer program instructions embodied on a computer readable memory, and/or functions performed by logic implemented in hardware, in accordance with an exemplary embodiment of this invention. Thus, in an exemplary embodiment, the rule matching process 185 is defined as computer-readable code and the one or more processors 110 will, in response to execution of the computer-readable code, will cause the computing system 135 to perform the operations in flow 300 of FIG. 3.

The flow 300 begins when a rule (such as the rule between the beginning tag corresponding to 210-1 and the first ending tag </object>) is read (block 310) from the rule file 175. In block 312, the rule is analyzed, e.g., to determine a global object (specialObject in this example), the specified path 250-1, and the source field 260 and its name 265-1. The term global object refers to an object in the global scope.

Specifically, the line corresponding to 210-1 in FIG. 2 begins an example (which is ended by the closing tag </object>) for a rule that specifies that any value corresponding to source field 260-1 with the name 265-2 of "a" in any variable returned by a call to fun4 (or technically specialObject.fun1( ).fun2( ).fun3( ).field1.fun4( )) is a source, since reads from that field are assumed to be potential taint. The implementation of an exemplary rule system in the analysis should find all reads from this "a" field 260-1, which means finding all aliases of this "a" field 265-1 and then all the reads from these aliases. This is done by first locating in the application 160 all the aliases of global object specialObject. See block 315. This is done because specialObject itself may have aliases. Then the implementation detects in the application 160 all the calls to fun4 on those aliases of specialObject. See block 320. The return values from these calls are collected, since these are the elements of the DOM in which the analysis is interested. Finally, the analysis examines (block 340) all the return values corresponding to the "a" field 260-1 of those objects that the analysis has collected. The returned variables used in those field-read instructions are marked as sources by the analysis in block 345. Block 345 proceeds to block 360, where it is determined whether all rules have ben read. In this example, all the rules have not been read (block 360=No) and the flow proceeds to block 310.

FIG. 2 (see FIG. 2A) also has a second source rule example, beginning with a source type 210-2 in a start tag and ending in a corresponding end tag </object>. This object is assigned the name 220-2 of Attribute and the method 230-2 of interest is has a pair 240-2 of tags indicating ("false") the object does not return an array. The specified path 250-2 has two entries and ends on getMetadata (so the entire path is Node.getMetadata). The source field 260-2 is indicated as having a name 265-2 of an asterisk, "*", which means that all fields 260-2 are to be treated as sources of taint. Thus, any values returned from getMetadata (via blocks 310, 312, 315, 320, and 340 of FIG. 3) will be marked (block 345) as sources.

Figure 2B:
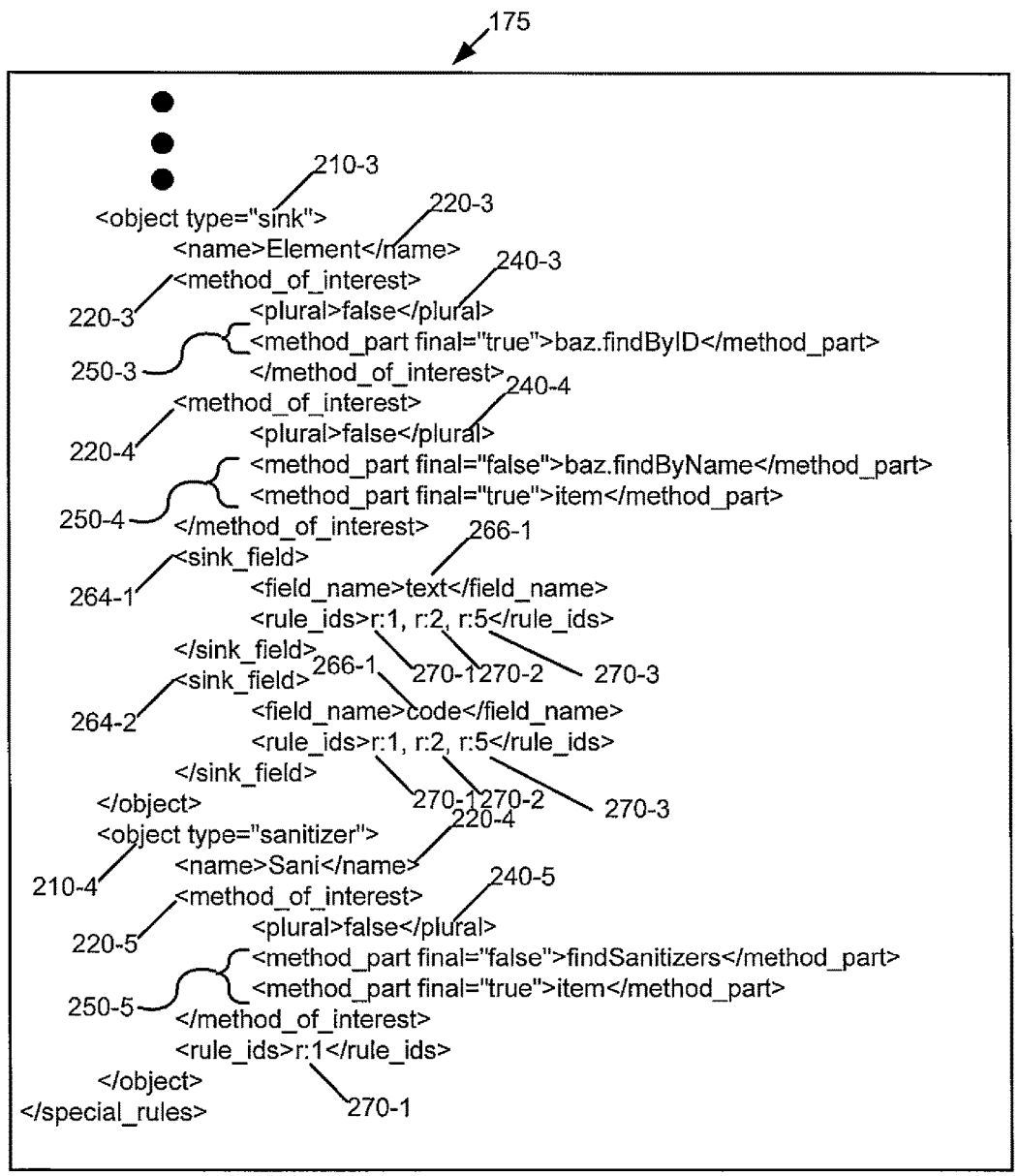
FIG. 2, including FIGS. 2A and 2B, provides an example of a rule file in accordance with an exemplary embodiment.
Figure 3:
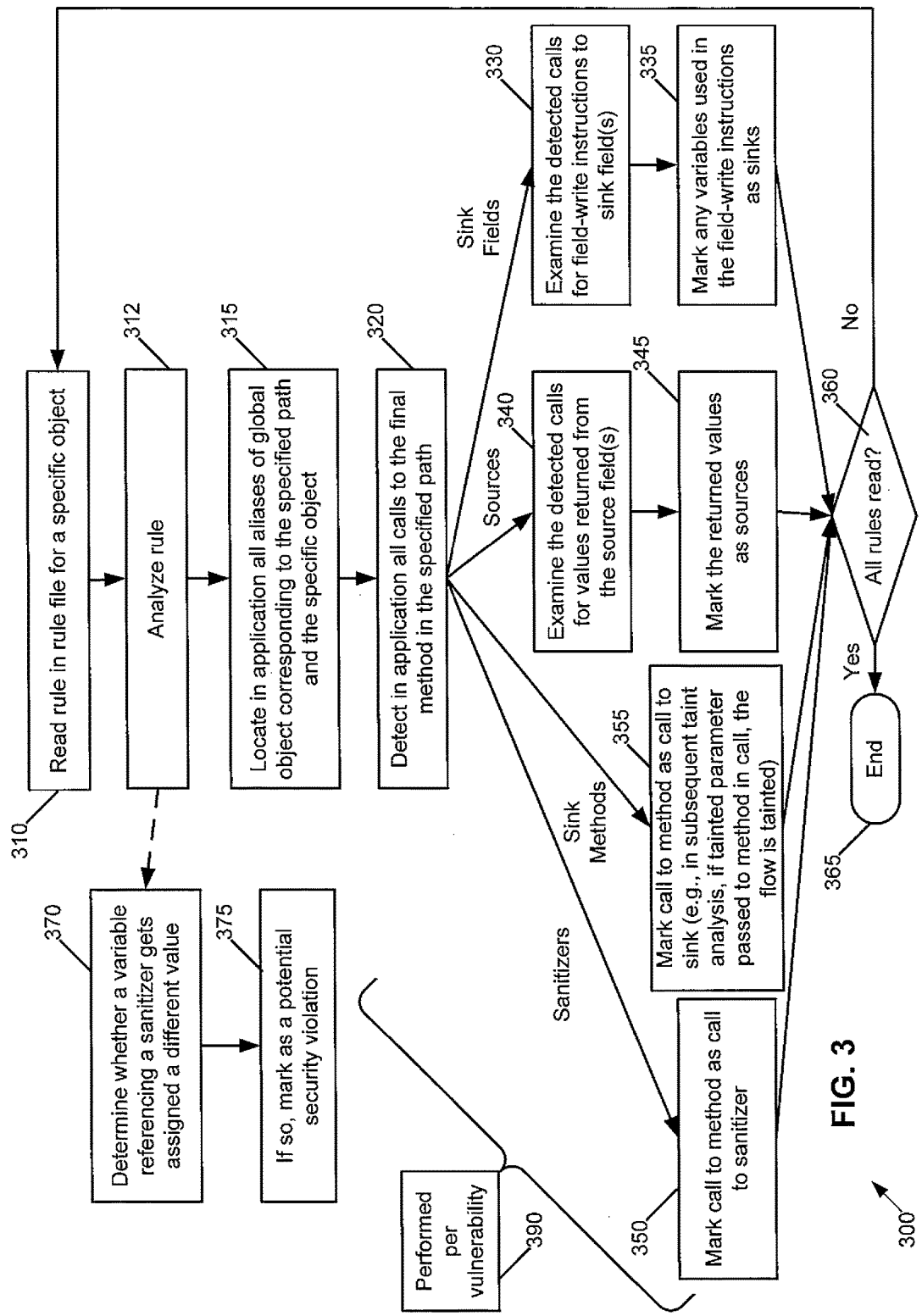
FIG. 3 is a logic flow diagram for performing rule matching, illustrates operations performed by a rule matching process, and illustrates the operation of an exemplary method, a result of execution of computer program instructions embodied on a computer readable memory, and/or functions performed by logic implemented in hardware, in accordance with an exemplary embodiment of this invention.

FIG. 2B also has a sink rule example (and therefore block 360=No, so the flow 300 proceeds to block 310), which is located between the start tag with the type 210-3 of "sink" and a corresponding end tag of <object>. The name 220-3 of the sink object is Element and the object does not return an array (see reference 240-3, where "plural" is indicated as "false"). There are two methods 220-3 and 220-4 of interest, where method 220-3 has a specified path 250-3 of baz.findByID and method 220-4 has a specified path 250-4 of baz.findbyName.item (as indicated by a method_part final="false" for baz.findByName and a method_part final="true" for the method "item"). Neither method returns an array as indicated by pairs 240-3 and 240-4 being "false". For sink fields, once blocks 310, 312, 315, and 320 are performed, block 330 is performed. In block 330, the rule matching process 185 examines the detected calls from block 320 for field-write instructions to sink field(s). In this example, there are two sink fields 264-1 and 264-2 indicated in the rule file 175, the fields "sink" 266-1 and "code" 266-2, respectively. Any field-write instructions to the sink field 264-1 "sink" 266-1 or the sink field 264-2 "code" 266-2 will be marked (block 335) as sinks. Each of the sink fields "sink" 266-1 and "code" 266-2 is relevant for the rule identifications r:1 270-1, r:2 270-2 and r:3 270-3, each of which relates to a particular security vulnerability.

It is noted that block 390 indicates that sources, sinks, and sanitizers are relevant to particular vulnerabilities. For instance, one source may provide taint for XSS but that same taint may not (or may) be important for another vulnerability. At the stage of rule matching, the rule identifications 270 may be kept such that the identifications 270 correspond to the sources, sinks, and sanitizers, but during a later stage of taint analysis (see, e.g., block 430 of FIG. 4), the rule identifications 270 will be more determinative of tainted flows. That is, if a sink is relevant to two rule identifications 270 and to two corresponding vulnerabilities, if a flow into the sink is endorsed for one of the vulnerabilities, this flow is not a tainted flow, but if another flow into the sink is not endorsed for another vulnerability, the other flow is a tainted flow. It should be noted that the same flow may be subject to multiple vulnerabilities.

FIG. 2B further has a sanitizer rule example (and therefore block 360=No, so the flow 300 proceeds to block 310), which is located between the start tag with the type 210-4 of "sanitizer" and a corresponding end tag of </object>. The name 220-4 of the sanitizer object is Sani and the object does not return an array (see reference 240-5, where "plural" is indicated as "false"). The method 220-5 of interest has a specified path 250-5 of findSanitizers.item (as indicated by a method_part final="false" for findSanitizers and a method_ part final="true" for the method "item"). Blocks 310, 312, 315, and 320 are performed, but in block 350, any method call instructions to the final method ("item") in the specified path 250-5 are marked as sanitizers. The sanitizer method "item" is relevant for the rule identification r:1 270-1, which means the sanitizer method is considered to provide proper endorsement for the security vulnerability corresponding to this rule identification (e.g., XSS). In subsequent taint analysis, therefore, any path that passes through the sanitizer method "item" prior to passing through a subsequent sink can be considered to have the taint properly endorsed for the specific vulnerability corresponding to the rule identification. Note that taint introduction after the sanitizer but before the sink would be considered to be a separate flow with its own source and sink. It may also be possible for, e.g., a static analysis tool 150 to place a call to the sanitizer method "item" into a tainted path that does not contain a sanitizer method, in order to have the taint properly endorsed for the specific vulnerability corresponding to the rule identification. In the example of FIG. 2b, the sanitizer object corresponds to the last rule (block 360=Yes) and the flow 300 ends in block 365.

It is also possible to find sinks that are passed parameter(s) that are tainted. For instance, blocks 310, 312, 315, and 320 would be performed, and in block 355, for sink methods, any call to the method indicated as being a sink (e.g., a call to the final method in block 320) is marked as a call to a sink. In a subsequent taint analysis (see FIG. 4), a parameter that is considered to be tainted and is passed to the method in one of a number of specified positions would cause a corresponding flow (e.g., of that parameter from a source to at least the method) to be marked as tainted. Note that a parameter that is passed to the method but not to one of the specified positions would not have its corresponding flow marked as tainted.

These rules are expressed without using any type information. This is beneficial for languages like JavaScript that lack strong type systems. Additionally, these rules are even impossible to express using types for a language like Java. The exemplary rules discussed above describe how to obtain objects of interest (e.g., sources, sinks, and sanitizers) rather than simply their type. If types alone were used and the type returned from baz.findByID was Element, every Element in the program could result in a source, when, in actuality, only Elements that come from the search algorithm in the global object baz's findByID function should result in a source.

Another possible feature of the exemplary rule system presented herein is the detection of method overwrites. In languages like JavaScript, functions can be aliased, which means variables can point to functions. This feature allows variables pointing to security-sensitive functions (including sanitizers and sink methods) to be reassigned. For example, the variable encodeURIComponent points to a sanitizer function in standard JavaScript. It is possible to reassign encodeURIComponent and point this variable at a function that performs no sanitization. If a variable pointing to a sanitizer gets assigned a different value, untrusted input may no longer be sanitized as intended. This implementation of this exemplary rule system may analyze the source program to detect any assignment to a variable that should point to a sanitizer function. Thus, in FIG. 3, in block 370, it is determined whether a variable referencing (e.g., pointing to) a sanitizer gets assigned a different value. If so, the assignment is marked as a potential security violation in block 375. Blocks 370 and 375 are applicable to sanitizers and may be performed after corresponding sanitizer rules are analyzed (block 312) and during an analysis of the application 160 in FIG. 3 and/or with taint analysis performed in block 430.

It is noted that these techniques may be also used for languages that support typing. For instance, for a typed language like Java, the same techniques may be used with few or no modifications.

Figure 4:
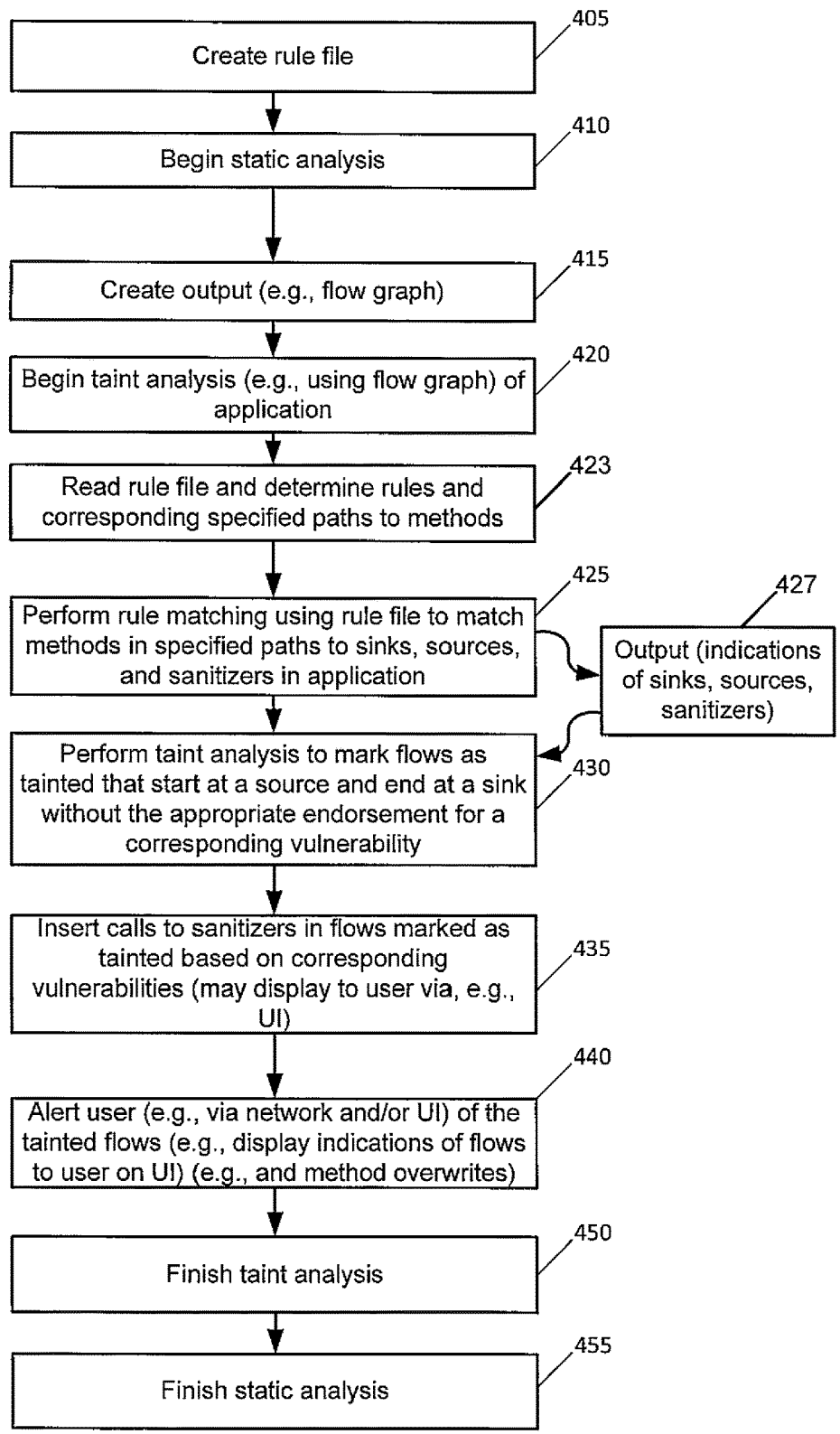
FIG. 4 is a logic flow diagram for performing a static analysis of an application as part of a security vulnerability analysis, and illustrates the operation of an exemplary method, a result of execution of computer program instructions embodied on a computer readable memory, and/or functions performed by logic implemented in hardware, in accordance with an exemplary embodiment of this invention.

The rule matching process of FIG. 3 will typically be implemented as an overall process for security analysis and particularly security vulnerability analysis using static analysis and taint analysis techniques. Note that it is possible to also use real-time security vulnerability analysis techniques, but taint analysis is typically implemented as part of static analysis techniques. Turning to FIG. 4, a logic flow diagram is shown for performing a static analysis of an application as part of a security vulnerability analysis. FIG. 4 illustrates the operation of an exemplary method, a result of execution of computer program instructions embodied on a computer readable memory, and/or functions performed by logic implemented in hardware, in accordance with an exemplary embodiment of this invention.

In block 405, a person familiar with the language being used and the sources, sinks, and sanitizers for the language will create the rule file 175 according to a grammar, an example of which is illustrated in FIG. 2. A security expert may be consulted to provide input as to which elements in the language are the sources, sinks, and sanitizers. Blocks 410-455 are assumed to be performed by the computing system 135, e.g., under control of the static analysis tool 140. For ease of reference, only static analysis is described herein, and other possible analyses performed by a security analysis tool 140 are not described.

In block 410, the computing system 135, e.g., under control of the static analysis tool 150, begins a static analysis. The static analysis will create output (block 415), which can include a flow graph, which is a representation, using graph notation, of all paths that might be traversed through an application 160 during its execution. Many other types of representations of an application 160 may also be created, such as heap representations and the like. However, a taint analysis typically concentrates on an analysis that uses a flow graph. In block 420, computing system 135 begins the taint analysis (e.g., using the flow graph at least in part). As previously described, taint analysis is a technique used to determine which flows through a flow graph are tainted from sources of taint to sinks without being endorsed by passing through a sanitizer in an appropriate manner.

In block 423, the computing system 135 reads the rule file 175 and determines the rules and corresponding specified paths to methods for sinks, sources, and sanitizers. In block 425, rule matching is performed (e.g., by the computing system 135 under control of the rule matching process 185) using the rule file 175 to match methods in the specified paths 250 to sinks, sources, and sanitizers in the application 160. Rule matching has been described in reference to FIG. 3. The rule matching process of FIG. 3 produces output 427, which corresponds to blocks 335, 345, 350, and 355 of FIG. 3 and basically provides indications of the sinks, sources, and sanitizers found during the rule matching process.

In block 430, the computing system 135 performs taint analysis to mark flows as tainted that start at a source and end at a sink without the appropriate endorsement by a sanitizer for a corresponding vulnerability. One input to the taint analysis is the output 427 from the rule matching process 185 (and block 425). The taint analysis may also take input from other sources.

One possible example for those flows marked as tainted is for the computing system 135 (e.g., under control of the taint analysis tool 170 and/or the static analysis tool 150) to insert calls to sanitizers into the flows marked as tainted based on corresponding vulnerabilities. See block 435. The user may also be alerted to the insertion of the calls via, e.g., the UE 180 on the display(s) 176. It should be noted that the user may also be able to accept or reject these insertions using, e.g., the UI 180 and/or the external device(s) 190. Alternatively or in addition, the computing system 135 (e.g., under control of the taint analysis tool 170 and/or the static analysis tool 150) can alert a user (e.g., via a network using the network interface(s) 130 and/or the UI 180 on the display(s) 176) of the tainted flows. For instance, indications of the flows may be displayed to a user via the UI 180. See block 440. This will allow a user to address the tainted flows. The operations performed in block 440 may also include indication(s) of detected method overwrites, as the method overwrites are described above (e.g., as being reassignments of variables pointing to sanitizers to other values).

In block 450, the tainted analysis is finished. In block 455, the static analysis is finished.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronyms that appear in the text or drawings are defined as follows.
DOM document object model
HTML hypertext markup language
I/F interface
JS JavaScript
SQL structured query language
UI user interface
XSS cross-site scripting

What is claimed is:

1. A method, comprising:
reading by a computing system a rule file comprising one or more rules having specified paths to methods, each method corresponding to one of a sink, source, or sanitizer;
matching by the computing system the methods to corresponding ones of sinks, sources, or sanitizers determined through a static analysis of an application, wherein the static analysis determines at least flows from sources of information to sinks that use the information; and
performing by the computing system, using the sinks, sources, and sanitizers found by the matching, a taint analysis to determine at least tainted flows from sources to sinks, wherein the tainted flows are flows passing information to sinks without the information being endorsed by a sanitizer.

2. The method of claim 1, wherein:
the specified paths comprise a global object and one or more methods accessible via the global object;
matching further comprises, for each of the one or more rules:
locating in the application all aliases of the global object for a specified path for a rule; and
detecting all calls to a method indicated as being a final one of the one or more methods in the specified path.

3. The method of claim 2, wherein:
rules for sinks further comprise one or more indications of one or more sink fields;
matching further comprises, for each of one or more rules corresponding to sinks:

examining detected calls for field-write instructions to one or more sink fields indicated in the rule; and marking any variables used in the field-write instructions as sinks.

4. The method of claim 2, wherein:

rules for sources further comprise one or more indications of one or more source fields;

matching further comprises, for each of one or more rules corresponding to sources:

examining detected calls for values returned from one or more sources fields indicated in the rule; and marking any returned variables as sources.

5. The method of claim 2, wherein:

matching further comprises, for each of one or more rules corresponding to sanitizers:

marking detected calls to the method indicated as being the final one of the one or more methods in the specified path as a sanitizer.

6. The method of claim 2, wherein:

detecting all calls to a method indicated as being a final one of the one or more methods in the specified path further comprises marking the detected calls to the method as being a call to a sink; and performing the taint analysis further comprises, for parameters indicated as being tainted and passed to the methods via the calls marked as being sinks, marking flows corresponding to the parameters as being tainted.

7. The method of claim 1, wherein:

the rule file further comprises, for each of the one or more rules, one or more rule identifications, each of which relates to a particular security vulnerability; and matching further comprises matching the methods to corresponding ones of sinks, sources, or sanitizers to the rule identities; and performing the taint analysis further comprises performing, using the sinks, sources, and sanitizers found by the matching and for each one of security vulnerabilities corresponding to the rule identities, a taint analysis to determine at least tainted flows from sources to sinks, wherein the tainted flows are flows passing information to sinks without the information being endorsed by a sanitizer for a corresponding one of the security vulnerabilities indicated by rule identities that are the same for the source, sink and sanitizer in the flows.

8. The method of claim 7, further comprising inserting a call to a sanitizer for a particular one of the security vulnerabilities into one of the flows determined to be tainted for that particular security vulnerability.

9. The method of claim 1, wherein performing taint analysis further comprises determining whether a variable referencing a sanitizer gets assigned a different value and, responsive to assignment of the different value, marking the assignment as a potential security violation.

10. The method of claim 9, further comprising displaying indications of the marked assignments to a user on a user interface.

11. The method of claim 1, further comprising displaying indications of the tainted flows to a user on a user interface.

12. The method of claim 1, wherein the rule file is written at least in part using markup tags.

13. The method of claim 1, wherein the rule file does not list the type of object or type of method that should be a source, sink, or sanitizer.

14. The method of claim 1, wherein a path comprises a sequence of field reads.

15. A computing system comprising:

one or more memories storing computer-readable code; and one or more processors, configured in response to executing the computer-readable code to cause the computing system to perform:

reading by the computing system a rule file comprising one or more rules having specified paths to methods, each method corresponding to one of a sink, source, or sanitizer;

matching by the computing system the methods to corresponding ones of sinks, sources, or sanitizers determined through a static analysis of an application, wherein the static analysis determines at least flows from sources of information to sinks that use the information; and performing by the computing system, using the sinks, sources, and sanitizers found by the matching, a taint analysis to determine at least tainted flows from sources to sinks, wherein the tainted flows are flows passing information to sinks without the information being endorsed by a sanitizer.

16. A computer program product comprising a non-transitory computer readable storage medium having program code embodied therewith, the program code executable by a computing system to cause the computing system to perform:

reading by the computing system a rule file comprising one or more rules having specified paths to methods, each method corresponding to one of a sink, source, or sanitizer;

matching by the computing system the methods to corresponding ones of sinks, sources, or sanitizers determined through a static analysis of an application and by the computing system, wherein the static analysis determines at least flows from sources of information to sinks that use the information; and performing by the computing system, using the sinks, sources, and sanitizers found by the matching, a taint analysis to determine at least tainted flows from sources to sinks, wherein the tainted flows are flows passing information to sinks without the information being endorsed by a sanitizer.

* * * * *